March 10, 1959 E. A. ROCKWELL 2,876,626
APPARATUS FOR APPLYING INTENSIFIED FLUID PRESSURE
Filed June 14, 1955
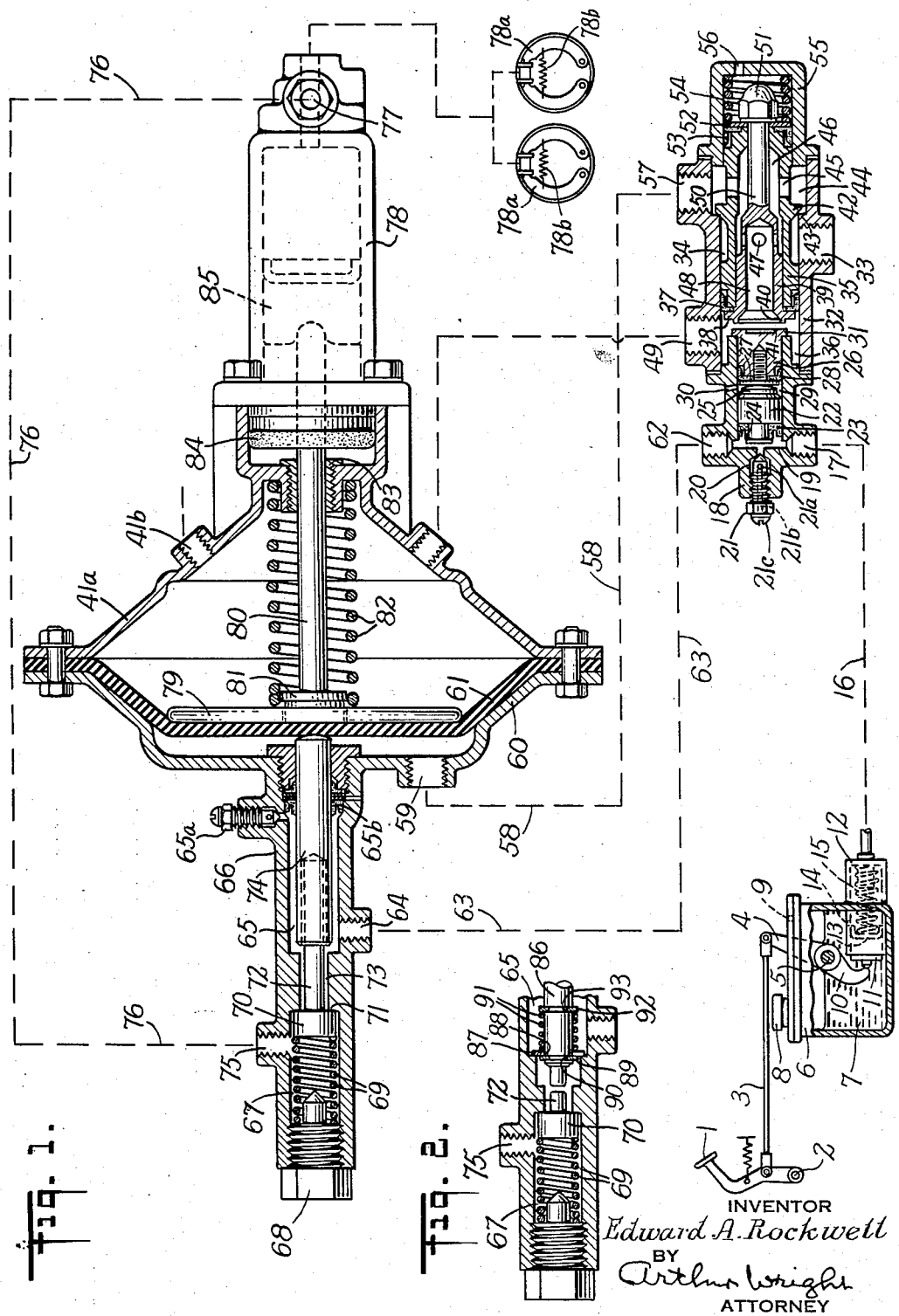
INVENTOR
Edward A. Rockwell
BY
Arthur Wright
ATTORNEY United States Patent Office 2,876,626
Patented Mar. 10, 1959

2,876,626

APPARATUS FOR APPLYING INTENSIFIED FLUID PRESSURE

Edward A. Rockwell, Los Angeles, Calif.

Application June 14, 1955, Serial No. 515,379

10 Claims. (Cl. 60—54.5)

My invention relates particularly to an apparatus designed for actuating any desired part for work performance in such a way as to coordinate substantially the travel of said part with the travel of the means which actuates the same and is an improvement over the invention of my prior Patents Nos. 2,372,015 and 2,525,426. In certain aspects the invention relates to subject matter also shown in my Patent No. 2,794,320, filed June 17, 1950, and issued June 4, 1957.

It is a general object of my invention to provide an apparatus of the above character whereby a hydraulic device to be moved for work performance may be effectively operated through the agency of a fluid while substantially coordinating the travel of the part to be moved with the means for moving the ame.

More specifically it is an object to accomplish this purpose utilizing a manually controlled master cylinder and a combined transfer and residual valve in the connection between the master cylinder and the hydraulic device, which valve is effective to transfer fluid into the line connected to the hydraulic device and is also effective to maintain a predetermined residual pressure.

A further object is to accomplish this by applying any desired modulated pressure thereafter at any point in the said movement.

Another object is to provide a hydraulically operated brake in which a master cylinder controls a power operated motor by supplying the master cylinder liquid to means controlling the motor and to the brake. Still another object is to accomplish the same by the utilization of a vacuum. Further objects of my invention will appear from the detailed description of the same hereinafter.

While my invention is capable of embodiment in many different forms for the purpose of illustration I have shown only one form of the same in the accompanying drawings, in which—

Fig. 1 is a view of the apparatus applied to the operation of vacuum controlled brake systems; and Fig. 2 is a longitudinal section of a modified compensating valve construction.

In the drawings, the travel controlled features of my invention are applied to the operation of automotive vehicle brake systems involving the use of a vacuum. As shown in said figure, I have provided a pedal 1 carried by a fixed pivot 2 on the chassis of an automobile (not shown). The pedal 1 is pivotally connected by a link 3 to an operating lever 4 mounted on a shaft 5 extending into a master cylinder 6, which may be of any desired construction, as for example the master cylinder 6 as disclosed in the Loughead Patent No. 1,707,063, granted March 26, 1929, on Pressure Mechanism for Brake Systems. As shown in the drawings, for example, the master cylinder 6 may have the usual reservoir 7 and the usual filling cap 8 as well as the usual vent 9. The shaft 5 which extends into the master cylinder 6, furthermore, may be provided with an operating lever 10 which bears on a plunger 11 in a cylinder 12 provided with a piston 13 so placed that in the retracted position thereof it uncovers a compensating port 14. The said piston 13 is retracted by a spring 15.

The liquid discharged from the master cylinder 6 is supplied by a pipe 16 to a valve mechanism for controlling the application of pressure from a source of pressure differing from atmosphere, to a motor supplying power for a power actuated master cylinder supplying fluid to slave brake cylinders. In the present instance the liquid from the pedal operated master cylinder 12 is led by means of the hydraulic pipe 16 to an inlet port 17 which is located in a plunger housing 18 having therein a chamber 19 containing a plunger moved by the said liquid to actuate the aforesaid valve mechanism. The chamber 19 can be vented from time to time, as desired, through a passageway 20 leading to an air bleeder screw plug 21 having a transverse passageway 21a leading to a longitudinal passageway 21b which is adapted to be closed normally by a removable screw plug 21c. Within the chamber 19 there is a plunger 22 having a U-shaped rubber seal 23 carried in an annular recess 24 on the forward part of said plunger. The rear of said plunger 22 has an extension 25 which is arranged to move rearwardly a valve plunger 26 having a screw head 27 thereon holding in place a leather gasket 28. Between the extension 25 and the screw head 27 there is a space 29 which is vented to the outer air through a small port 30. The rear end of the valve plunger 26 has a flange 31 which extends over the end of the plunger housing 18 within a valve casing 32. The said valve casing 32 has a port 33 which is adapted to act as a vent and which is connected to an annular chamber 34 on the periphery of a cylindrical valve member 35 located in a cylindrical chamber 36 in the valve casing 32 within which it is sealed by a leather gasket 37 which is located adjacent to a flange 38 on an internal tubular valve member 39 located within the valve member 35. The said internal tubular valve member 39 is, furthermore, provided with an annular valve element 40 which cooperates with a valve seat 41 on the valve plunger 26. Adjacent to the chamber 34 the valve member 35 has located thereon a tapered valve element 42 which cooperates with a valve seat 43 on the valve casing 32. When the conical valve 42 is unseated the air is then admitted to an annular chamber 44 in the casing 32, which in turn admits the air through radial ports 45 in the valve member 35 to a cylindrical chamber 46 in the cylindrical valve member 35 in which chamber the internal valve member 39 is located. The air thus admitted to the chamber 46 can pass through radial openings 47 in the internal tubular valve member 39 to a cylindrical chamber 48 within said member 39 so that when the valve 40, 41 is open the released air can pass out through a vacuum port 49 in the casing 32. For supplying power to operate a power actuated master cylinder, in the drawings there is shown a motor contained within a housing 41 and operated by pressure from a source of pressure differing from atmosphere. In the illustrative form of the invention shown, the motor housing 41a is connected by means of a vacuum port 41b to a source of vacuum, as for example, the engine manifold of the vehicle motor. The valve mechanism just described provides means for controlling the application of vacuum to the motor contained within the housing 41a, by releasing air through the valve housing port 49 and then to the housing 41a. It will be noted that the internal tubular valve member 39 has extending rearwardly therefrom a rod 50 which passes through the end of the valve member 35 and is held in place thereon by a nut 51 which, by means of a washer 52, clamps in place a leather gasket 53. A spring 54 rests against the said washer 52 and at the other end rests against the inside of a head 55 secured to the valve casing 32. The head 55 also has a vent 56. The said head 55 and the plunger housing 18 can be secured to the valve casing 32 in any desired way. The air when admitted to the chamber 46, when the valve 40, 41 is in closed position, passes out by an air port 57 by a pipe 58 to an inlet port 59 in a forward diaphragm shell 60 having a flexible diaphragm 61 of any desired material impervious to the air, for example a laminated oil-treated woven fabric, clamped between the two shells 41a and 60. This supply of air through the pipe 58 will not take place, however, until after sufficient pressure has been exerted through the pipe 16 so as to move the plunger 22, close the valve 40, 41 and open the valve 42, 43. Before the said valves are moved in this way, however, the manual hydraulic pressure will have passed initially from the chamber 19 through the outlet port 62 and thence through a pipe 63 to an inlet opening 64 which leads to a chamber 65, having a bleeder valve 65a and an air and oil seal 65b, in the forward shell 60, which has an extension 66 provided with a chamber 67 normally closed by a plug 68. A light spring 69 is provided, resting at one end thereof against the plug 68 and at the other end on a liquid compensating valve head 70 adapted to be seated normally by the pressure from the spring 69 on a shoulder 71 within the said chamber 67. The valve head 70 has a valve stem 72 which extends through an opening 73 and thence into a bore in a plunger 74, said bore being larger in diameter than said stem 72 and acting as a guide for the stem 72. Said extension of the forward shell 66 has a port 75 which is connected by a pipe 76 to a port 77 located beyond the discharge side of a power actuated master cylinder 78, which leads to wheel brake shoes 78a having pull back springs 78b. Against the rear face of the flexible diaphragm 61 a head 79 rests, which is carried on a piston 80 screw-threaded to a recessed ring 81 attached to said head 79. A coil spring 82, which is in contact with the head 79 and spaced laterally slightly away from the ring 81, rests at one end against the head 79 and at the other end against the interior of the shell 41a.

So that there is a "feel" through parts 79, 80 and 81 limited axial movement is provided between the ring 81 on the piston 80, and the flexible diaphragm, so that the left hand end of the piston 80 may touch the surface of the flexible diaphragm itself, and by stressing it to the left, move the plunger 74 entirely independently of the force exerted by the diaphragm spring 82. As will appear hereinafter, such movement of the plunger 74 is produced upon a condition of excess residual pressure in the brake cylinders and power actuated master cylinder. The piston rod 80 passes out through a screw-threaded bushing 83 and thence through a liquid-tight packing 84 to the interior of the power actuated cylinder 78, where it rests against the end of a power actuated master cylinder piston 85, which, by reason of the valve 70 being normally closed, at first exerts a residual pressure by means of the plunger 74 against the spring 69, but not initially enough to unseat the valve 70. This residual slight pressure is normally maintained in the brake cylinders. However, any excess pressure above such slight residual pressure will be released by pressure from the power actuated master cylinder 78 moving the plungers 80 and 74 to unseat the valve head 70 until such excess pressure is released.

Fig. 2 shows a modified form of compensation valve which can be used instead of the valve head 70 and plunger 74. In this instance, instead of the plunger 74 there is provided a plunger 86 in the cylinder 65, which is normally spaced away from the valve stem 72 because of a split spacing ring 87, one part of which is seated at the end of the cylinder 65 and another part of which has an internal flange 88 which is located at the right side of a split ring 89 carried in a groove 90 at the end of the plunger 86. A light helical compression spring 91 normally forces the flange 88 against the ring 89 because the other end of the spring 91 is seated against the left face of another split ring 92 carried in a groove 93 on the plunger 86.

In the operation of my invention, referring first to Fig. 1, it will be understood that the apparatus is designed, preferably, for the operation of vacuum brakes of any desired system and which may be applied to the operation of brakes of vehicles generally. In other words, it may be applied, if desired, to the operation of any present form of vacuum air-brake system. In the apparatus as shown, when it is desired to apply the brakes, as for example to operate wheel brake cylinders of wheel brakes of an automobile not shown, the pedal 1 is moved downwardly, thereupon discharging liquid from the pedal operated master cylinder 12, which is replenished with liquid in the retracted position of the piston 11 by the port therein which communicates with the liquid reservoir 7. The liquid thus supplied to the pipe 16 will pass initially through the pipe 63 to the port 64, thence to the chamber 67 past the normally seated spring-pressed valve 70, to apply further pressure, by means of the port 75, to the pipe 76 and thence to the wheel brakes and by-passing the power actuated master cylinder 78, thus seating or applying further pressure to the brakes preparatory to applying the main braking force. Upon a further increase of pressure in the pipe 16 from the pedal operated master cylinder the piston 22 will be moved towards the right, thereby closing the valve 40, 41 and thereafter unseating the valve 42, 43 which allows atmospheric air to enter through the port 33 so as to be supplied by the pipe 58 to the left side of the movable wall in the casing 60, while maintaining the valve 70 seated by the action of the spring 69 and cutting off the supply of the liquid from the pedal operated master cylinder 6 to the wheel brakes. Thereafter, the liquid is supplied upon pressure to the wheel brakes from the intensifying means for power actuated master cylinder 78 and the plate 81 also now contacts with the spring 82. This operation will continue as long as the manual pressure is being increased through the pipe 16. When any particular point is reached while the manual pressure is not being increased, the pressure of the air which has been admitted past the valve 42, 43 will accumulate slightly to overcome the manual pressure so as to lap the said valve 42, 43. Upon relaxation of the manual pressure through the pipe 16 the valve 40, 41 will be opened, thereby discharging the accumulated air through the port 49, thereupon restoring the open space between the plate 81 and the spring 82 while the valve 70 remains in closed position during the movement of the wall 61 to the left in the casing 60 due to the pressure from the spring 82 and thereafter from the plunger 80 and cylinder 78. The brake shoes, as a result, will release to their initial position, out of engagement with the brake drums.

To summarize the operation of the apparatus, the compensating valve 70 in the line 63, 76 which forms a connection between the manually operated master cylinder 12, and the power actuated master cylinder 78 and the brake cylinders, is normally spring urged toward its seat, as shown in Figure 1. This position is assumed when the pedal operated master cylinder is released and the residual pressure in the power actuated master cylinder 78, the brake cylinders, and in the line extending therefrom to the valve 70 acts on the head of the latter to seat the valve closing off the line 63 to the pedal operated master cylinder. The valve element 70 is subjected to the pressure in the line 63 leading to the manually actuated master cylinder 12, and the pressure in the line 76 leading to the brake cylinder which constitutes the hydraulic device actuated by the system. In the event that after release of the pedal operated master cylinder 12 there is an excess residual pressure in the power actuated master cylinder 78 and the brake cylinders, the plunger 80 moves toward the left to stretch the diaphragm 61, and by means of the plunger 74, unseats the valve 70 against the force exerted by the resilient spring acting against its head, to release the excess residual pressure. The movement of the plunger 80 is produced by the residual pressure acting against the piston 85 of the power actuated master cylinder. Thus the piston 85 constitutes a control member having an effective area subject to the pressure of the hydraulic device and arranged to unseat the compensating valve element 70 allowing flow to release excess residual pressure when the pressure of the brake cylinders remains above a predetermined residual value. This residual value is determined by resilient means effectively opposing movement of the control member which, in the exemplary form of the invention shown in Figure 1 includes the spring 69 acting on the valve element 70.

The valve 70 also functions as a transfer valve to admit fluid into the line 76 leading to the power actuated master cylinder and the brake cylinders immediately following initial actuation of the pedal. This provision dispenses with the necessity for a separate reservoir connected to the power cylinder and permits the utilization of a single reservoir associated with the pedal actuated master cylinder. Thus, when the pedal is operated fluid is admitted via the line 63 to the head of the valve 70 moving the latter to the left when the force due to the resilient spring 69 is overcome admitting fluid to the line 76. When the pressure in the line 76 builds up due to the actuation of the power actuated master cylinder, the transfer valve 70 is closed so as to prevent reverse flow.

The modification of my invention shown in Fig. 2 operates in the same way as the form of my invention shown in Fig. 1 except that in Fig. 2 the normally closed position of the valve 70 is insured by the interval between the end of the plunger 86 and the valve stem 72 due to the spacing ring 87 and the spring 91. However, any undue excess or increase of residual pressure in the brake line or in the master cylinder 78 will compress the spring 91 and cause the plunger 86 to move to the left until the plunger 86 acts on the valve stem 72 to unseat the valve head 70 long enough to release any such excess of pressure beyond the normal maximum of the residual pressure in the brake line or power actuated master cylinder 78.

While I have described my invention above in detail I wish it to be understood that many changes may be made therein without departing from the spirit of the same.

I claim:

1. In a hydraulic control system for a hydraulic device, said system having lines filled with fluid and leading to the hydraulic device, the combination comprising, a manually operated hydraulic master cylinder, a plunger cylinder having a plunger movable in response to fluid displaced by the master cylinder upon manual actuation thereof for applying pressure to the fluid in the lines, a conduit for conveying fluid between said cylinders, compensating valve means in said conduit for controlling the flow of fluid therethrough, said compensating valve means including a valve element subject to the pressure in the conduit and movable in the direction of flow of fluid displaced by the master cylinder to open the conduit and pass fluid into the lines until a predetermined make-up pressure is established, and mounted so that pressure on the valve element is effective to move the same in the opposite direction to close the conduit upon pressure in the lines reaching said make-up pressure to prevent return flow, and means connecting said plunger to said valve element, said plunger being subject to the pressure in the lines, for moving the valve element when the master cylinder is withdrawn in the direction to allow flow through the conduit until the pressure in the lines is reduced to a predetermined residual pressure.

2. In a hydraulic control system for a hydraulic device, the combination comprising, a manually operated hydraulic master cylinder, a connection for conveying fluid between said master cylinder and said device, and compensating valve means for controlling the flow through said connection, said compensating valve means including a valve seat, a movable valve element normally spring urged toward said seat, said valve element being subjected to the pressures of the master cylinder and of the hydraulic device, flow from the master cylinder upon actuation thereof tending to unseat the valve element against the force of the spring to transfer fluid to the hydraulic device until a predetermined make-up pressure is obtained, a control member for said compensating valve means associated with said valve element and its seat and mounted for movement in a direction to unseat the valve element to release excess residual pressure upon de-actuation of the master cylinder, resilient means opposing such movement of the control member, said control member having an effective area subject to the pressure of the hydraulic device so that the valve element will be unseated allowing flow to release said excess residual pressure when the pressure of the hydraulic device remains above a predetermined residual value determined by the force exerted by said resilient means.

3. In a hydraulic control system for a hydraulic device, the combination comprising, a manually operated hydraulic master cylinder; a power unit controlled by said master cylinder and including a plunger for supplying fluid under pressure to said hydraulic device and boosting the pressure of the master cylinder; a by-pass connection for conveying fluid around the power unit between the master cylinder and the hydraulic device; and compensating valve means for controlling the flow through said by-pass connection, said compensating valve means including a valve seat, a movable valve element normally spring urged toward said seat, said valve element being subjected to the pressures of the master cylinder and of the hydraulic device, flow from the master cylinder upon actuation thereof tending to unseat the valve element against the force of the spring to transfer fluid to the hydraulic device until a predetermined make-up pressure is obtained, means connecting said power unit plunger to said valve element, said plunger being movable in a direction to unseat the valve element to release excess residual pressure upon de-actuation of the master cylinder, resilient means opposing such movement of the plunger, said plunger being subject to the pressure of the hydraulic device so that the valve element will be unseated allowing flow to release said excess residual pressure when the pressure of the hydraulic device remains above a predetermined residual valve determined by the force exerted by said resilient means.

4. In a hydraulic control system for a hydraulic device, the combination comprising, a manually operated hydraulic master cylinder, a power unit including a plunger for supplying fluid under pressure to said hydraulic device; a source of power for operating said power unit; valve means operated by said master cylinder to direct power to said power unit; a by-pass line for conveying fluid around the power unit between the master cylinder and the hydraulic device; and compensating valve means for controlling the flow through said by-pass line, said compensating valve means including a valve element normally spring urged toward its seat, said valve element being subjected to the pressures of the master cylinder and of the hydraulic device, flow from the master cylinder upon actuation thereof tending to unseat the valve element against the force of the spring to transfer fluid to the hydraulic device until a predetermined make-up pressure is obtained, means providing a lost motion connection between said power unit plunger and said valve element, said plunger being movable in a direction to take up said lost motion and unseat the valve element to release excess residual pressure upon de-actuation of the master cylinder, resilient means opposing such movement of the plunger, said plunger being subject to the pressure of the hydraulic device so that the valve element will be unseated allowing flow to release said excess residual pressure when the pressure of the hydraulic device remains above a predetermined residual value determined by the force exerted by said resilient means.

5. In a hydraulic control system for a hydraulic device, the combination comprising, a manually operated hydraulic master cylinder; a power unit for supplying fluid under pressure to said hydraulic device, said power unit including a casing, a movable wall mounted in said casing, and a spring for returning said movable wall to a retracted normal position; a source of power fluid for operating said power unit; valve means operated by said master cylinder to direct power fluid from said source to said movable wall; a plunger connected to the movable wall to move coordinately therewith; means in said casing defining a cylinder for said plunger having an outlet for connection to said hydraulic device; a by-pass connection for conveying fluid around the power unit between the master cylinder and the hydraulic device, and compensating valve means for controlling the flow through said by-pass connection, said compensating valve means including a valve body carried by said power unit casing and having a bore therein, inlet and outlet ports in the body communicating with the bore and connecting the latter to the by-pass connection, a movable valve element in the bore normally spring urged toward its seat to cut off communication between the inlet and outlet ports, said valve element being subjected to the pressures of the master cylinder and of the hydraulic device, flow from the master cylinder upon actuation thereof tending to unseat the valve element against the force of the spring to transfer fluid through the by-pass connection to the hydraulic device until a predetermined make-up pressure is obtained, means providing a lost motion connection between said power unit plunger and said valve element, said plunger being movable in a direction to take up said lost motion and unseat the valve element to release excess residual pressure when said first-mentioned spring has returned the movable wall to its retracted normal position upon de-actuation of the master cylinder, so that the valve element will be unseated allowing flow to release said excess residual pressure when the pressure of the hydraulic device remains above a predetermined residual value.

6. In a hydraulic control system for a hydraulic device, the combination comprising, a manually operated hydraulic master cylinder; a power unit including a plunger for supplying fluid under pressure to said hydraulic device, said power unit including a movable wall connected to said plunger; a source of power for operating said power unit; valve means controlled by said master cylinder for directing power from said source to said movable wall; a by-pass connection for conveying fluid around the power unit between the master cylinder and the hydraulic device, and compensating valve means for controlling the flow through said by-pass connection, said compensating valve means including a normally seated valve element, and means connecting said power unit plunger to said valve element, said plunger being movable in a direction to unseat the valve element to release excess residual pressure upon de-actuation of the master cylinder, the pressure of the hydraulic device acting on said plunger being effective to unseat the valve element allowing flow to release said excess residual pressure when the pressure of the hydraulic device remains above a predetermined residual value.

7. In a hydraulic control system for a hydraulic device, the combination comprising, a manually operated hydraulic master cylinder, a power unit controlled by said master cylinder and including a plunger for supplying fluid under pressure to said hydraulic device, a by-pass connection for conveying fluid around the power unit between the master cylinder and the hydraulic device, and compensating valve means for controlling the flow through said by-pass connection, said compensating valve means including a valve seat, a movable valve element normally spring urged toward said seat, said valve element being subject to the pressures of the master cylinder and of the hydraulic device, flow from the master cylinder upon actuation thereof tending to unseat the valve element against the force of the spring to transfer fluid to the hydraulic device until a predetermined make-up pressure is obtained, means providing a lost-motion connection between said power unit plunger and said valve element, said plunger being movable in a direction to take up said lost motion and unseat the valve element to release excess residual pressure upon de-actuation of the master cylinder, said plunger being subject to the pressure of the hydraulic device so that the valve element will be unseated allowing flow to release said excess residual pressure when the pressure of the hydraulic device remains above a predetermined residual value.

8. In a hydraulic braking system for a vehicle having hydraulic brake operating means, the combination comprising, a manually operated hydraulic master cylinder, a power unit operated by said master cylinder and connected to supply fluid under pressure to said brake operating means, a connection for conveying fluid between said master cylinder and said brake operating means, and valve means for controlling the flow through said connection, said valve means including a cut-off valve which allows flow from the master cylinder and prevents return flow; and means subject to residual pressure in the brake operating means and effective upon de-actuation of the master cylinder for moving said cut-off valve in a direction to open communication through said connection allowing return flow from the brake operating means to reduce the pressure to a predetermined residual value.

9. In a hydraulic control system for a hydraulic device, the combination comprising, a manually operated hydraulic master cylinder, a connection for conveying fluid between said master cylinder and said device, compensating valve means for controlling the flow through said connection, said compensating valve means including a valve element, a valve seat therefor, means mounting said valve element and its seat for relative movement, a spring normally seating the valve element, said valve element being subjected to the pressure of the master cylinder and of the hydraulic device, said valve element being movable in a direction such that it will be unseated by the fluid displaced from the manually operated master cylinder until a predetermined make-up pressure is obtained, a control member associated with said valve element and its seat and mounted for movement in a direction to unseat the valve element, resilient means opposing such movement of the control member, said control member having an effective area, and fluid transmitting means connecting said effective area with the hydraulic device so that the valve element will be unseated allowing flow to release excess residual pressure when the pressure of the hydraulic device remains above a predetermined residual value determined by the force exerted by said resilient means.

10. In a pedal operated hydraulic braking system for a vehicle having hydraulic brake operating means, said system having lines filled with fluid, the combination comprising, a pedal operated hydraulic master cylinder, a braking cylinder having a plunger operated by movement of the pedal for applying pressure to the fluid in the lines, a connection for conveying fluid between said master cylinder and the brake lines, compensating valve means in said connection including a valve element operatively connected to said plunger, a valve seat therefor, means mounting said valve element and the seat for relative movement, a spring urging valve element toward its seat, said valve element being subjected to the pressure of the master cylinder and of the fluid in the lines, said valve element being movable in a direction such that it will be unseated upon movement of the pedal and application of the master cylinder against the force of the spring until a predetermined make-up pressure is obtained in the lines, said plunger being subject to the pressure in the lines and being movable in a direction to unseat the valve element upon release of the master cylinder, and a yieldable means opposing such valve unseating movement of the plunger so that the valve element will be unseated allowing flow to release excess residual pressure when the pressure in the lines remains above a predetermined residual value sufficient to overcome the force exerted by said yieldable means.

References Cited in the file of this patent

UNITED STATES PATENTS

| | | |
|---|---|---|
| 2,328,637 | Freeman | Sept. 7, 1943 |
| 2,372,014 | Rockwell | Mar. 20, 1945 |
| 2,525,426 | Rockwell | Oct. 10, 1950 |